__Patented May 1, 1962__

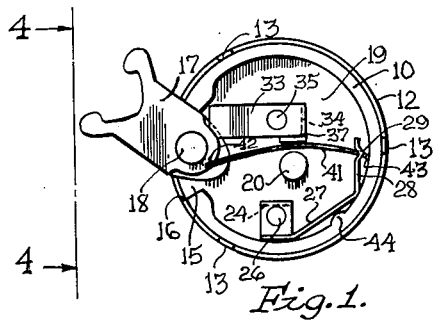

3,032,622
SNAP-ACTION ON AND OFF SWITCH
Walter L. Cherry, Jr., and Daniel W. Grady, Highland Park, Ill., assignors to Cherry Electrical Products Corp., Highland Park, Ill., a corporation of Illinois
Filed Aug. 20, 1959, Ser. No. 835,030
2 Claims. (Cl. 200—67)

Our invention relates to new and useful improvements in a snap-action on and off switch and more particularly to an electrical switch which has a positive snap-action movement.

Another important object of our invention is in the provision in a switch of this character of an arrangement of parts which are suitable for encasement within a compact housing.

Another object of our invention is in the provision in a switch of this character of a switch blade actuator which assures proper snap-action of a switch blade into a selected position.

A further object of our invention is in the provision in a switch of this character of an arrangement between a switch blade and its actuator whereby they have a functional relation with each other for determining their respective on-off positions when they co-operate together as a snap-action switch.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a top plan view of our improved snap-action switch with its cover removed;

FIG. 2 is a top plan view of our switch similar to FIG. 1 but showing the parts in actuated position;

FIG. 3 is a bottom plan view of our switch;

FIG. 4 is a side view as viewed from line 4—4 of FIG. 1; and

FIG. 5 is a perspective view of the parts of our invention in an exploded relation with respect to each other.

Our invention relates to an electrical snap-action switch commonly used in connection with an electric circuit which requires therein a switch capable of having an on and off position.

Our improved snap-action on and off switch comprises a circular, hollow body 10. This body 10 has a normally open side which is adapted to be closed by a circular cover 11.

A circular metal ring-like casing 12 is adapted to embrace the peripheral side wall of the housing 10. This casing 12 is provided on one peripheral edge thereof with attaching lugs 13. About the other peripheral edge of the casing 12 are a pair of backing members 14 for the body 10 when it is encased in the casing 12 as seen in FIG. 3.

Both the body 10 and the casing 12 are provided with aligned notches 15 and 16 respectively. Through these notches 15 and 16 is adapted to extend a portion of an actuator 17. This actuator 17 is pivoted about a pintle 18 extending inwardly of the body 10 from the back wall 19 thereof.

The back wall 19 of the body 10 is provided with a non-conductive center post or stud 20, the purpose or function of which will be hereinafter made apparent.

Formed in the back wall 19 adjacent to and beneath the center post 20 is a slot 21. Immediately beneath the slot 21 is a circular opening 22. A base terminal plate 23 is provided with a laterally extending terminal post 24. This terminal post 24 is adapted to be projected through the slot 21 so as to expose a portion thereof beyond the back wall 19 of the body 10 as seen in FIGS. 3 and 4. Through the opening 22 and through a corresponding aperture 25 formed in the terminal plate 23 there is adapted to be projected an attaching rivet 26.

The base terminal plate 23 provides an extension 27 which terminates into an upstanding arm 28. Adjacent its free end there is formed in the arm 28 a V-notch 29. Formed in the base of the V-notch 29 is a rectangular opening 30, the purpose and function of which will be made apparent.

The back wall 19 of the body 10 has formed therein above and adjacent to the center post 20 a second slot 31. Immediately adjacent to one side of the slot 31 is a circular opening 32. A terminal plate 33 is provided with a laterally extending terminal post 34. This terminal post 34 is adapted to be projected through the slot 31 so as to expose a portion thereof beyond the back wall of the housing 10. A rivet 35 is adapted to be projected through the opening 32 and a like opening 36 formed in the terminal plate 33 so as to fixedly connect such terminal plate 33 to the back wall 19 of the housing 10.

The terminal plate 33 provides a contact bearing portion 37 which extends in a spaced parallel direction with respect to the center post 20 as viewed in FIGS. 1 and 2.

The actuator 17 has its inner end formed to provide an arcuated lip 38. This lip 38 provides a base for a recess like formation 39. The inner end of the actuator 17 has an arcuated end which is offset with respect to the lip 38 and which provides a slot 40 extending transversely with respect to the long axis of the actuator 17 and which has open communication with the recess 39.

A flexible switch blade 41 has one end 42 positioned in the slot 40 of the actuator 17. The opposite end of the switch blade 41 provides a tongue 43 adapted to be projected into the rectangular opening 30 formed at the base of the V-notch 29 of the arm 28 of the terminal plate 23. As the switch blade 41 is of a length greater than the distance between its connection with the actuator 17 on one end and its connection with the arm 28 on the other end, it is forced to assume a bowed condition as seen in FIG. 1.

As viewed in FIGS. 1 and 2 the inner surface of the peripheral wall of the body 10 is provided with a head 44. This head 44 is adapted to bear against the extension 27 of the terminal plate 23 for a purpose hereinafter made apparent.

When our snap-action, on and off switch is in its "on" position the switch blade 41 will be in engagement with a contact carried by the contact carrying member 37 of the base terminal plate 33 as viewed in FIG. 1. When the actuator 17 is pivoted about the pintle 18 from the position shown in FIG. 2, it will compress the switch blade 14 longitudinally against the arm 28 and flex the switch blade from the position shown in FIG. 1 to that shown in FIG. 2, to a position from engagement with the contact carrying member 37 and into contact with the stud 20, the stud 20 limiting the degree of flexing of the switch blade to the position shown in FIG. 2. The reverse pivotal movement of the actuator 17 will flex the switch blade 41 back into engagement with the contact carrying member 37. The resiliency of the arm 28 is maintained by the bead 44 bearing against the extension 27 of the terminal plate 23. The resiliency of the arm 28 upon the switch blade 41 transferred therethrough onto the actuator 17 will maintain the actuator in either of its extreme positions.

The center post 20 prevents the switch blade 41 from becoming disengaged from either the actuator 17 or arm 28 of the terminal plate 23.

A contact bearing member similar to 27 may be employed in place of the center post 20, thereby producing a double throw action instead of the single throw shown and described.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A switch of the class described comprising a circular housing having a cavity therein and an aperture in one side wall thereof,
   - a pintle carried in said aperture and extending transversely through the cavity of said housing,
   - an actuating member pivotally carried by said pintle and having one end portion extending into the cavity and provided with a seat,
   - the opposite end of said actuating member extending out of a notched-out portion formed in the side wall of said housing,
   - a terminal member carried by one side wall of said housing within said cavity and providing a tangential resilient portion terminating into a free arm,
   - said free arm adjacent the end thereof providing a seat positioned substantially opposite the seat provided by said actuated member,
   - a flexible switch blade positioned in said cavity and extending under compression between and with its end portions positioned in said seats,
   - a non-conductive stop extending centrally from the rear wall of the housing transversely of said cavity,
   - a fixed terminal member carried by the one wall of said housing and having a portion within said cavity providing a contact end extending in parallel spaced relation to said stop,
   - said switch blade having its medial portion positioned between and flexed into contact with either said stop or said contact end of said fixed terminal member by said actuating member, and
   - a means provided by the side wall of said housing and in bearing engagement with said terminal member adjacent said tangential resilient portion thereof for maintaining the resiliency of the free arm so the same may be moved out of its normal plane by said switch blade as the latter is caused to be flexed by said actuating member.

2. A switch as defined in claim 1 wherein said last named means comprises a bead formed on the side wall of said housing and projecting inwardly of the cavity and in bearing engagement with said terminal member for maintaining the resiliency of said free arm of said terminal member.

References Cited in the file of this patent

UNITED STATES PATENTS

| | | |
|---|---|---|
| 2,240,770 | Hammerly | May 6, 1941 |
| 2,717,933 | Carden | Sept. 13, 1955 |

FOREIGN PATENTS

| | | |
|---|---|---|
| 244,851 | Germany | Mar. 18, 1912 |
| 971,540 | France | July 26, 1950 |
| 1,115,014 | France | Dec. 26, 1955 |
| 1,152,341 | France | Sept. 2, 1957 |